US008224897B2

(12) United States Patent
Kanazawa et al.

(10) Patent No.: US 8,224,897 B2
(45) Date of Patent: Jul. 17, 2012

(54) AUTOMATICALLY SHARING A USER'S PERSONAL MESSAGE

(75) Inventors: Keiji Kanazawa, Seattle, WA (US);
Stephen R Gordon, Bellevue, WA (US);
George Joy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 11/762,674

(22) Filed: Jun. 13, 2007

(65) Prior Publication Data

US 2008/0313256 A1    Dec. 18, 2008

(51) Int. Cl.
*G06F 15/16* (2006.01)
(52) U.S. Cl. ........ 709/204; 709/200; 709/203; 709/219; 705/14.61; 705/14.64; 705/14.68; 705/14.73; 705/14.41
(58) Field of Classification Search .................. 709/206, 709/204, 219; 705/26, 14.4, 14.12, 14.39, 705/14.73
See application file for complete search history.

(56) References Cited

U.S. PATENT DOCUMENTS

| | | | |
|---|---|---|---|
| 5,848,397 A * | 12/1998 | Marsh et al. ................ | 705/14.61 |
| 6,182,050 B1 | 1/2001 | Ballard | |
| 6,493,722 B1 * | 12/2002 | Daleen et al. ......................... | 1/1 |
| 6,954,728 B1 * | 10/2005 | Kusumoto et al. ........... | 705/14.4 |
| 6,968,179 B1 | 11/2005 | De Vries | |
| 6,983,311 B1 | 1/2006 | Haitsuka et al. | |
| 7,099,831 B2 | 8/2006 | Mitsuoka et al. | |
| 7,200,853 B2 | 4/2007 | Kawai | |
| 7,263,498 B1 * | 8/2007 | Van Horn et al. ................ | 705/26 |
| 2002/0160838 A1 | 10/2002 | Kim | |
| 2003/0145323 A1 * | 7/2003 | Hendricks et al. ............... | 725/34 |
| 2004/0139161 A1 * | 7/2004 | Loh ............................... | 709/206 |

(Continued)

FOREIGN PATENT DOCUMENTS

WO    WO2005088993 A1    9/2005

OTHER PUBLICATIONS

"JMessenger", retrieved on Apr. 25, 2007, at <<http://www.jmessenger.com/privacy_policy.htm>>, JMessenger, 2006, pp. 1-3.

(Continued)

*Primary Examiner* — Yves Dalencourt
(74) *Attorney, Agent, or Firm* — Lee & Hayes, PLLC

(57) ABSTRACT

Described techniques enable a particular user to automatically share a piece of content with a group of users. To share the content, the particular user navigates to a Website or the like to identify the desired piece of content. The particular user then chooses to share the piece of content by actuating a button, an icon, or the like displayed within the content (e.g., Web content) or displayed within the browser's toolbar. In some embodiments, the users with whom the piece of content is then shared each include the particular user within a contact list. This document also describes techniques capable of enabling the particular user to allow a third party to select and share a piece of content. In some instances, the piece of content comprises an advertisement. This piece of content may be shared with a group of users that include the particular user as a contact.

6 Claims, 7 Drawing Sheets

U.S. PATENT DOCUMENTS

| | | | |
|---|---|---|---|
| 2005/0080682 A1* | 4/2005 | Wilson | 705/26 |
| 2005/0271961 A1* | 12/2005 | Jadwin et al. | 430/109.1 |
| 2006/0136298 A1 | 6/2006 | Klein et al. | |
| 2006/0212355 A1* | 9/2006 | Teague et al. | 705/14 |
| 2006/0259356 A1 | 11/2006 | Zhang et al. | |
| 2007/0233732 A1* | 10/2007 | Porter et al. | 707/104.1 |
| 2008/0154739 A1* | 6/2008 | Kalaboukis | 705/26 |
| 2008/0307066 A1* | 12/2008 | Amidon et al. | 709/217 |

OTHER PUBLICATIONS

"Messenger Goes Live for Advertisers", retrieved on Apr. 25, 2007, at <<http://www.microsoft.com/uk/press/content/presscentre/releases/2006/06/pr03650.mspx>>, Microsoft Coporation, pp. 1-3.

"Windows Live Messenger Personal Expression", retrieved on Apr. 25, at <<http://advertising.microsoft.com/Advertise/CreativeSpecDetail.aspx?CreativeSpecID=786>>, pp. 1-16.

* cited by examiner

AUTOMATICALLY SHARING A USER'S PERSONAL MESSAGE

BACKGROUND

Instant messaging applications and social networking websites have become increasingly popular as media for maintaining, growing, and initiating relationships. This media utilizes the Internet or some other network to connect users across the globe. To employ instant messaging, a user typically downloads a local instant messaging client and sends messages to one or more online users with use of the client. Social networking websites, meanwhile, often provide a user with space on one of the website's servers. This space allows the user to create a personal Webpage or the like, from which the user may communicate information about his or herself to other users of the Website.

Both instant messaging applications and social networking Websites often employ techniques for a user to monitor family or friends within the instant messaging or social network community. These same techniques also allow the user to communicate a status of the user to the family or friends. One specific technique enables the user to manually input text that will appear on other users' instant messaging clients or social networking Webpages. This text could include, for example, a statement informing other users that the user is "currently away from [her] desk". Unfortunately, current techniques require that a user manually enter this text or select the text from a very limited number of generic messages offered by the user's local instant messaging client.

SUMMARY

This document describes techniques capable of enabling a particular user to automatically share a piece of content with a group of users. To share the content, the particular user navigates to a Website or the like to identify the desired piece of content. The particular user then chooses to share the piece of content by actuating a button, an icon, or the like displayed within the content (e.g., Web content) or displayed within the browser's toolbar. In some embodiments, the users with whom the piece of content is then shared each include the particular user within a contact list of an instant messaging client. In other embodiments, these users somehow monitor the particular user within a Website platform, such as a social networking Website.

This document also describes techniques capable of enabling the particular user to allow a third party to select and share a piece of content. In some instances, the piece of content comprises an advertisement. Again, this piece of content may be shared with a group of users, some or all of which includes the particular user as a contact.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), and/or computer-readable instructions as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

The following discussion targets techniques for enabling a particular user to seek out a piece of content and automatically share the piece of content with a group of users. The discussion also targets techniques capable of enabling the particular user to allow a third party to select and share a piece of content.

In some instances described herein, a particular user selects, from a content provider, a piece of content to share. The content provider then distributes the selected piece of content in a manner effective to share the content with one or more users. These users include those who have chosen to monitor the particular user. For instance, some or all of these users could include the particular user upon a contacts list. These users could also include those listed in a contacts list of the particular user.

In other instances, a third party selects a piece of content on behalf of the particular user. The third party then shares this content with one or more users who have chosen to monitor the particular user and/or with users that the particular user monitors. To select and share this content, the third party may first receive consent from the particular user.

The discussion begins with a description of an illustrative environment in which pieces of content may be selected and shared amongst the group of users. The discussion continues with a section entitled "Selecting and Sharing Content", which describes how a particular user or the third party may employ the claimed techniques. A section entitled "Selecting the Piece of Content Responsive to the Sharing" follows, and discusses operations following a user selecting the content in response to the sharing by the particular user or the third party. Finally, a section entitled "Illustrative Processes" describes how the claimed techniques may be implemented as a series of operations.

Illustrative Environment

Figure 1:
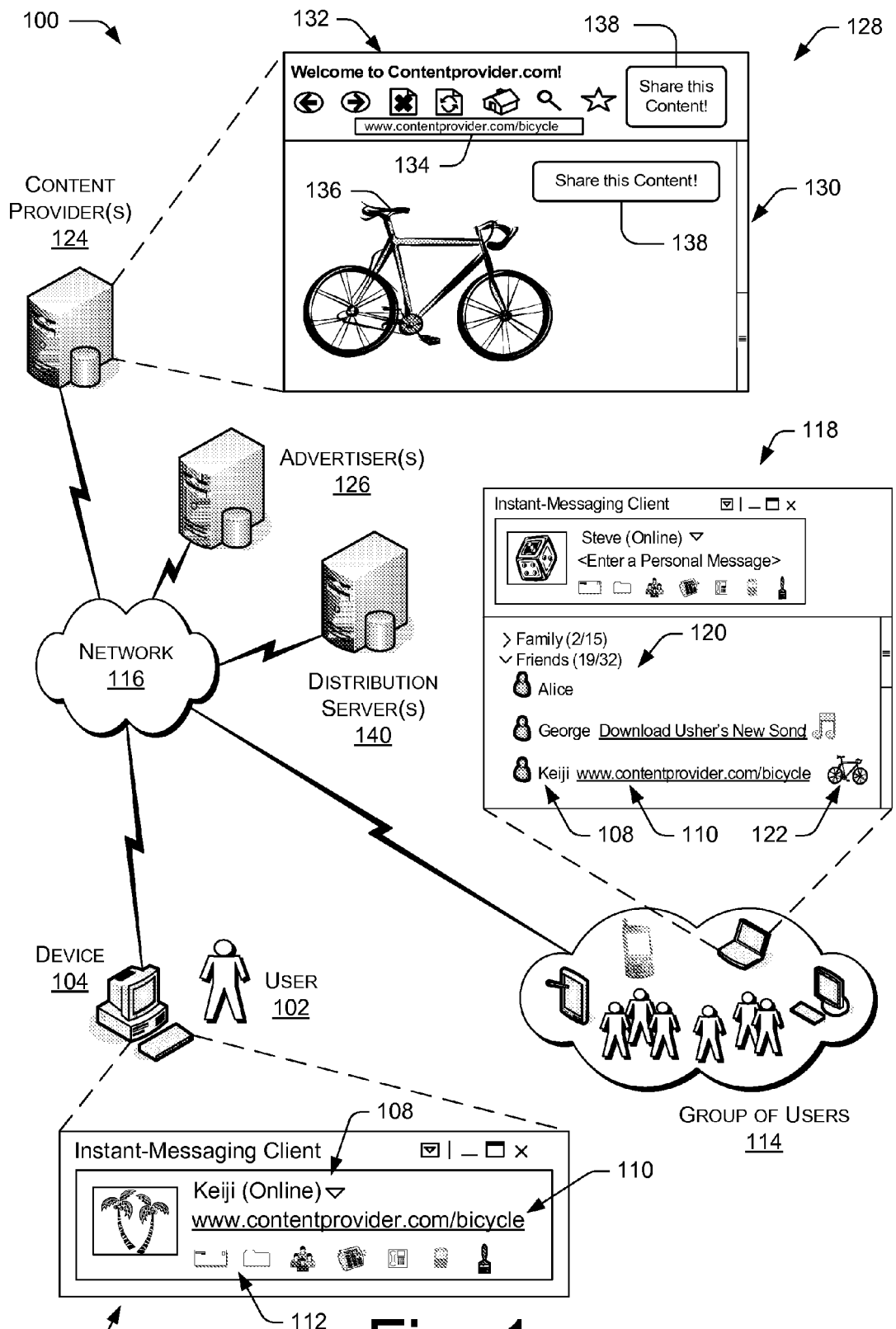
FIG. 1 illustrates an environment in which a particular user may automatically share a piece of content with a group of users, some or all of which may include the particular user as a contact.

FIG. 1 depicts an illustrative environment 100 in which content may be selected and shared amongst one or more users. Environment 100 includes a user 102 operating a computing device 104 to access an instant messaging client 106. While FIG. 1 illustrates computing device 104 as a personal computer, this device may also comprise, without limitation, a laptop computer, a mobile phone, a personal digital assistant (PDA), a portable media players (PMP), or any other computing device. In addition, while FIG. 1 illustrates instant messaging client 106, this discussion applies equally to social networking Websites, as well as any other online or network-based community where user 102 may share content with other users.

Instant messaging client 106 includes a name or identifier 108 of user 102 (here, "Keiji"), a personal message 110, and one or more tools 112 to operate the client. Instant messaging client 106 allows user 102 to enter personal message 110 into the client and share the personal message with a group of users 114. Group of users 114 includes one or more other users of the instant messaging service. More specifically, these users include those who have chosen to somehow monitor user 102. For instance, group of users 114 may include those who list user 102 as a "contact" within the instant messaging or social networking environment. Alternatively or additionally, group of users 114 may also include users that user 102 himself includes as a "contact".

Personal message 110 allows user 102 to express any message to group of users 114 that user 102 desires. In addition, personal message 110 may take the form of nearly any form of data, such as text, images, video, and the like, as discussed in detail below.

In environment 100, computing device 104 couples with group of users 114 via a network 116. Network 116 may comprise the Internet, a Local Area Network (LAN), a Wide Area Network (WAN), a wireless network, and/or the like. In the current example, each user of group of users 114 employs a computing device to implement a respective instant messaging client.

FIG. 1 illustrates a representative instant messaging client 118 corresponding to one of the group of users 114 ("Steve"). Instant messaging client 118 includes a contacts list 120 that list each of the user's contacts. Contacts include those users that the exemplary user has chosen to monitor. For instance, these contacts are shown to include Alice, George, and Keiji. As illustrated, these contacts within list 120 may be divided within categories, such as family, friends, and/or the like.

One of the contacts listed within instant messaging client 118 includes user 102, identified by name 108. Contacts list 120 also includes personal message 110 of user 102. As illustrated, instant messaging client 118 associates personal message 110 with name 108 (and, hence, user 102). Here, instant messaging client 118 displays personal message 110 adjacent name 108. As such, user 102 is able to distribute his personal message 110 amongst a group of users 114 that include user 102 as a contact. Again, group of users 114 may include contacts listed by user 102 as well.

Additionally, contact list 120 displays metadata 122 adjacent to personal message 110. Metadata 122 may correspond to personal message 110 and may comprise any sort of displayable data as discussed in detail below.

To select personal message 110, user 102 may manually enter text or the like into the personal message space. Additionally, user 102 may employ computing device 104 to navigate to one or more content providers 124 and/or one or more advertisers 126. Content provider 124 may include a server such as a Web server that serves a Webpage to be rendered at computing device 104. This Webpage is rendered at the user's device via a browser interface 128. Browser interface 128 includes a content portion 130 (e.g., a Webpage) served from the server such as the Web server. Interface 128 also includes a browser toolbar 132. Browser toolbar 132 allows user 102 to navigate to a Web address 134 that corresponds to the displayed Web page.

Content portion 130, meanwhile, is shown to include a piece of content 136. Here, piece of content 136 comprises an image of a bicycle. Piece of content 136, however, may include a link, an image, a video, an animation, audio, an executable program, and/or any type of data that the particular user may wish to share with others. In fact, piece of content 136 may include an entire displayed Web page. In some implementations, piece of content 136 (such as the illustrated bicycle) may illustrate an item for sale on the displayed Web page.

Browser interface 128 also includes an icon 138 that enables user 102 to select piece of content 136 to share with group of users 114. As illustrated, icon 138 may display text, such as "Share this Content!", which indicates to user 102 that, upon the icon's selection, the piece of content will be shared. Browser interface 128 may display icon 138 within browser toolbar 132 and/or within content portion 130.

Upon actuation of icon 138, personal message 110 of user 102 may display piece of content 136 (or some data related thereto). As illustrated by instant messaging client 106, personal message 110 is shown to contain the Web address 134 associated with piece of content 136. As illustrated by instant messaging client 118, personal message 110 transmits via network 116 to instant messaging clients corresponding to each of group of users 114. As such, instant messaging client 118 is shown to include Web address 134 adjacent to name 108. In addition, while actuation of icon 138 may result in sharing the content as the user's personal message, this content may be shared in multiple other areas of instant messaging client 118.

Before piece of content 136 is shared, the user may be given the opportunity to modify what is displayed within the receiving instant messaging clients. For instance, user 102 may be able to personalize the title of the content (such as the link to the bicycle) that is displayed within instant messaging client 118. In the instant example, user 102 could choose to illustrate a hyperlink entitled "Check out this Bike!" as opposed or in addition to Web address 134.

Instant messaging client 118 also displays metadata 122 that relates to piece of content 136 and/or Web address 134, the metadata being displayed responsive to the sharing of the content. Similar to the discussion of pieces of content above, metadata 122 may include a link, an image, a video, an animation, audio, an executable program, and/or any type of data that corresponds to or represents piece of content 136. This may be chosen by user 102 or by content provider 124. Here, metadata 122 illustrates a picture of the bicycle that represents piece of content 136.

To transmit personal message 110 to each of group of users 114, content provider 124 may distribute Web address 134 that corresponds to piece of content 136 to the user's instant messaging client 106. Instant messaging client 106 may then share this content with group of users 114. Alternatively or in addition, content provider 124 may distribute this content to a distribution server 140. Distribution server 140 comprises, in some instances, a server that provides or is otherwise related to the employed instant messaging application (or social networking Website or the like in other implementations). When distribution server 140 receives the content, this server transmits the content to each user of group of users 114. This process of sharing content (and updating personal message 110 of user 102 on instant messaging client 118) may repeat each time that user 102 navigates to a content provider and selects a piece of content to share.

As introduced above, environment 100 includes advertiser 126. Advertiser 126 may include an advertising agency, a particular company or business, and/or any other entity that wishes to promote certain content. As such, user 102 may consent to allow advertiser 126 to promote certain content within personal message 110 of user 102. This content, which may comprise some sort of advertisement, may be chosen by the advertiser, by user 102, or by a combination thereof. Similar to content and metadata discussed above, the advertisement may include a link, an image, a video, an animation, audio, an executable program, and/or any type of data that a computing-device screen may render.

When a piece of content is selected, advertiser 126 transmits the content to instant messaging client 106 and/or to distribution server 140. This client and/or the distribution server may then update personal message 110 of user 102 on an instant messaging client of each user of group of users 114. For instance, instant messaging client 118 may update and reflect each new piece of content (e.g., each advertisement) selected by advertiser 126 and/or user 102.

In addition, advertiser 126, distribution server 140, and/or user 102 may receive a notification in response to a user of group of users 114 selecting a piece of content shared via personal message 110. Selecting may include clicking on a shared link displayed as a part of personal message 110. In some instances, clicking on this link navigates the user to the promoted content, located on a Website, for instance.

Furthermore, if a user of group of users 114 selects a shared advertisement and, in response, purchases something associated with the advertisement, then advertiser 126 is notified. Advertiser 126 and/or distribution server 140 may then bestow some benefit upon user 102. This benefit could comprise money, credit, a free download, points within the instant messaging or social networking community, or any other item, tangible or intangible, that may benefit user 102. Note that by bestowing a benefit upon user 102, user 102 may share in some of the revenue generated by sharing content amongst group of users 114. In addition, an entity that controls the instant messaging or social networking community may also receive a benefit.

In some embodiments, user 102 chooses to personally select and share one or more pieces of content (e.g., piece of content 136) at certain times, while also allowing advertiser 126 to select pieces of content at other times. Here, personal message 110 may display content selected by user 102 at a first time and advertisements or the like at a second time. In addition, note that user 102 could also display one or more manually-entered personal messages 110 at some times. Finally, personal message 110 may cycle through any combination of these options.

Selecting and Sharing Content

Figure 2:
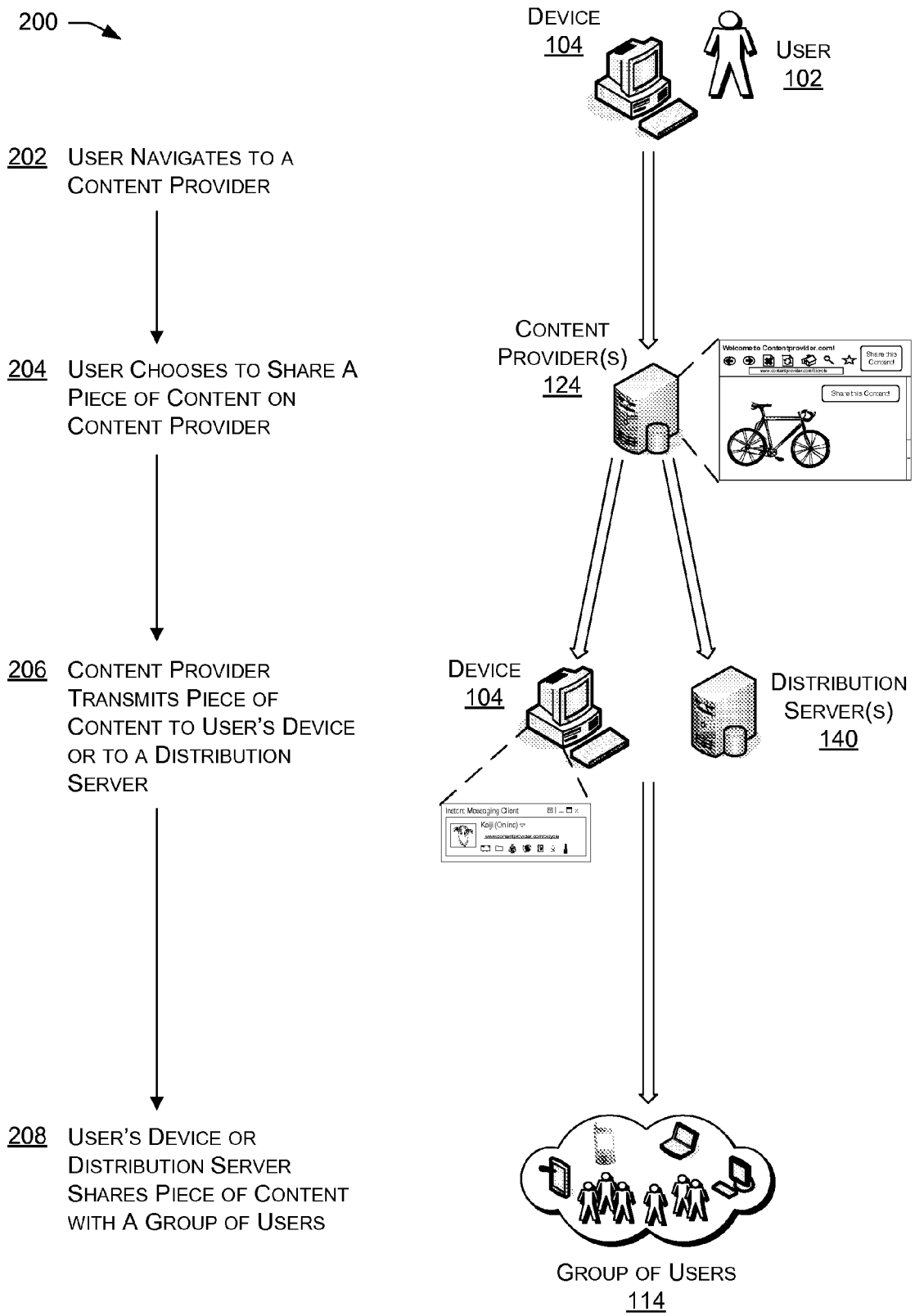
FIG. 2 illustrates a process for selecting a piece of content provided by a content provider and sharing the piece of content with the group of users.

FIG. 2 depicts an illustrative process 200 to enable a particular user to select and share a piece of content. At operation 202, a user such as user 102 utilizes computing device 104 to navigate to content provider 124. This content provider may provide a Web page, image, video, song, executable application, or any other type of data that user 102 may wish to share. At operation 204, user 102 chooses a piece of content from content provider 124 that user 102 wishes to share. In the illustrated environment, user 102 wishes to share a Web page that illustrates a bicycle. As discussed above, an icon within a browser toolbar or the displayed content portion allows the user to share this piece of content.

Operation 206 represents that content provider 124 transmits the piece of content to the user's device (computing device 104) and/or to a distribution server such as distribution server 140. If the selected piece of content is to be shared amongst users of an instant messaging service, social networking Website, or some other online or network-based environment, then distribution server 140 may be responsible for providing some or all of the service.

At operation 208, device 104 or distribution server 140 shares the selected piece of content with one or more users such as group of users 114. If device 104 shares the content, then the selected piece of content may propagate through the user's instant messaging client, social networking Webpage, or the like. Group of users 114, meanwhile, may include the user's contacts as well as users that include user 102 as a contact.

When the selected piece of content is shared, the content may be somehow associated with user 102. For instance, this content may be displayed as a personal message on instant messaging clients and/or on social networking Webpages. Furthermore, user 102 may choose to share multiple pieces of content and may configure the sharing such that the receiving clients, Webpages, or the like cycle through displaying different pieces of content selected by the user.

In addition, user 102 may receive a benefit (e.g., money, credits, points, etc.) in response to a user of group of users 114 selecting the content. The service such as the instant messaging service, meanwhile, may also charge content provider 124 to share the provider's content.

Figure 3:
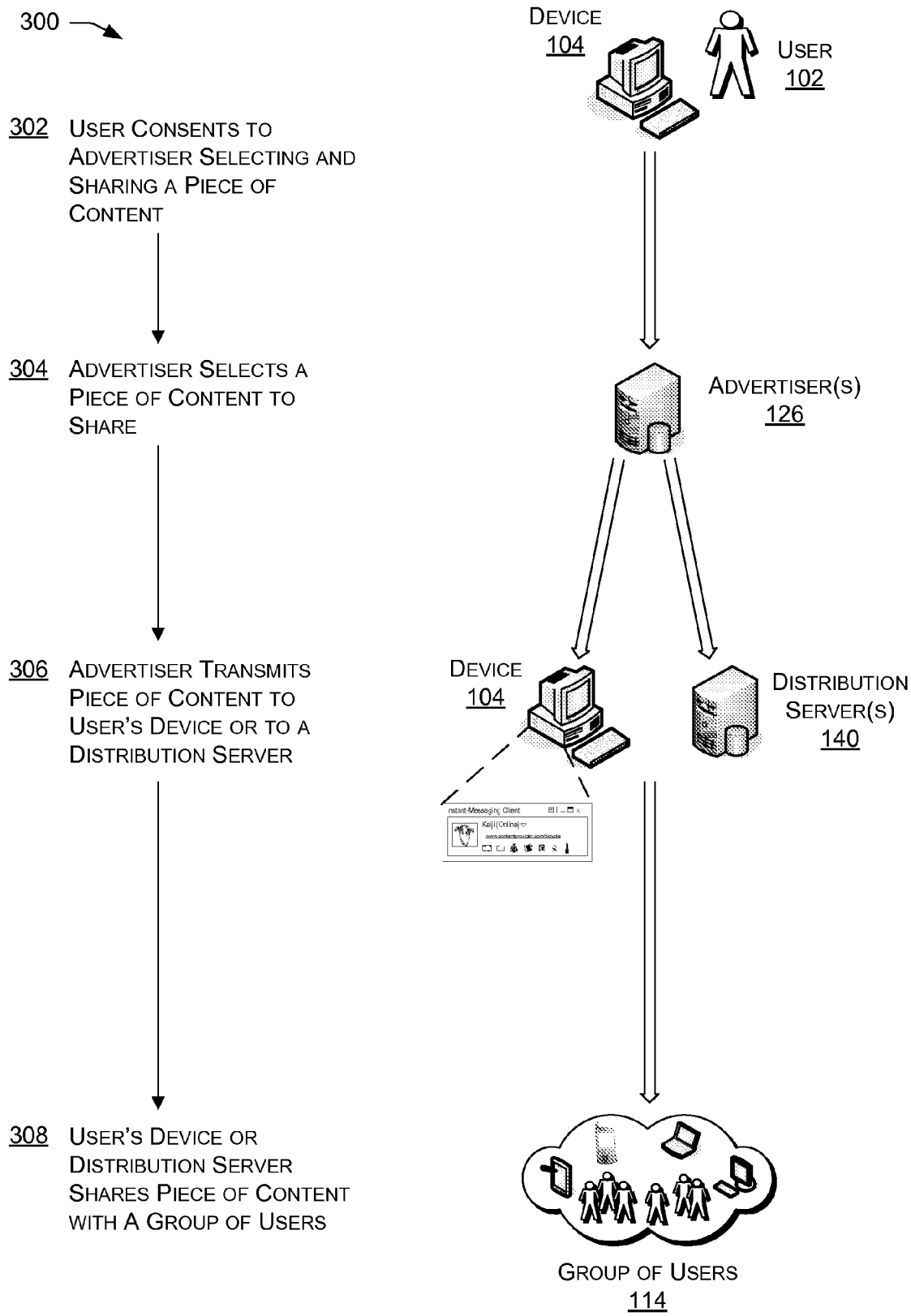
FIG. 3 illustrates a process for allowing a third party such as an advertiser to select a piece of content on behalf of the particular user and share the selected piece of content with the group of users.

FIG. 3 depicts an illustrative process 300 for enabling a third party to select a piece of content on behalf of a particular user and share the content with one or more users. At operation 302, user 102 consents to one or more advertisers 126 selecting and sharing one or more pieces of content on behalf of user 102. User 102 may consent by navigating to a Website associated with advertiser 126, by consenting during a download of an instant messaging application or the like, by signing up for a Webpage with a Social Networking Website, or by any other suitable fashion. By consenting, user 102 may allow advertiser 126 to share pieces of content on behalf of the user.

At operation 304, advertiser 126 selects a piece of content to share. Operation 306 then represents that advertiser 126 transmits this piece of content to the user's device and/or to a distribution server. In implementations employing an instant messaging service, the user's instant messaging client 106 may distribute the shared piece of content to the user's contacts or to users who include user 102 as a contact (e.g., group of users 114). Conversely, distribution server 140 may distribute this content to group of users 114 at operation 308. In addition, in instances where distribution server 140 offers the instant messaging service, social networking Website, or the like, distribution server 140 may charge advertiser 126 to distribute advertisements via user 102.

Finally, while process 300 illustrates advertiser 126 as sharing a single piece of content with group of users 114, advertiser 126 may continue to share other content with these users. For instance, advertiser 126 may share a new piece of content via user 102 based upon an agreed-upon schedule. Personal message 110 of user 102 accordingly changes as advertiser 126 cycles through these differing advertisements.

Figure 4:
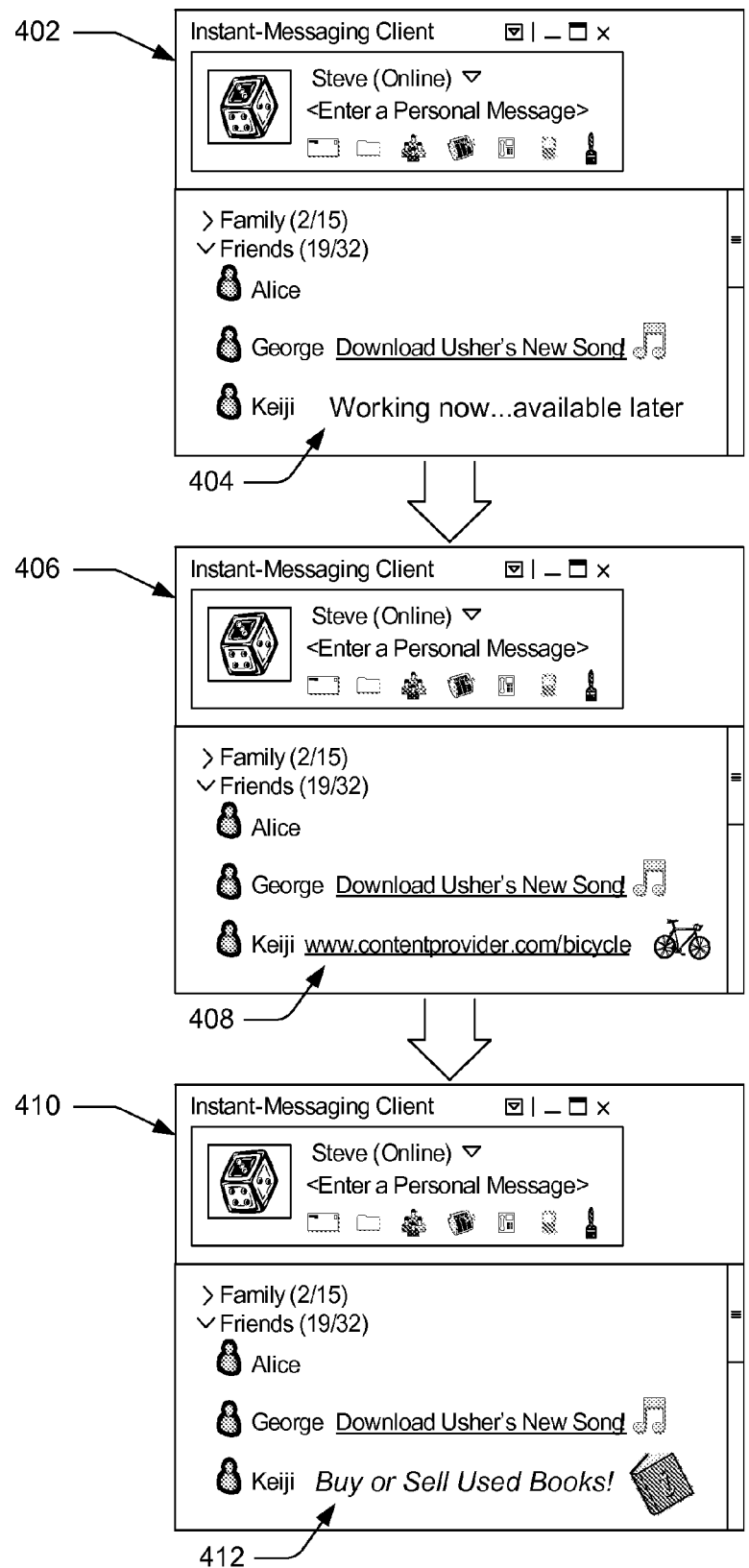
FIG. 4 depicts a series illustrative screen renderings of an instant messaging client of a user that includes the particular user as a contact. The illustrative renderings change in response to the particular user or third party sharing content.

FIG. 4, meanwhile, depicts a series of illustrative screen renderings of an instant messaging client of a user that includes the user 102 as a contact. As illustrated, the rendered client may change in response to the particular user and/or a third party sharing content via processes 200 and/or 300. This series of screen renderings show that a user's personal message may be configurable amongst manually-entered content, content selected by actuating an icon within a browser interface, and content selected and shared by a third party such as an advertiser.

FIG. 4 first illustrates a screen 402 of instant messaging client 118. Screen 402 illustrates a personal message 404 corresponding to user 102. Here, personal message 404 states that the user 102 is "Working now . . . available later". User 102 may have input this personal message manually or may have selected this personal message from those offered by instant messaging client 106.

FIG. 4 then illustrates a screen 406 that includes a personal message 408. Personal message 408 includes a URL address to the bicycle illustrated in FIG. 1 as well as a piece of metadata that relates to the bicycle. Here, the metadata comprises an image of the bicycle. In this example, user 102 navigated to content provider 124 to select and automatically share personal message 408 via process 200.

Finally, FIG. 4 illustrates a screen 410 that includes a personal message 412. Personal message 412 states: "Buy or Sell Used Books!" and includes an image of a book. Here, a third party such as advertiser 126 selected and shared personal message 412 via process 300 or the like.

Again, FIG. 4 thus illustrates that a user's personal message may be configurable amongst manually-entered content, content selected by actuating an icon within a browser interface, and content selected and shared by a third party such as an advertiser. For instance, user 102 could request that the user's personal message comprises user-selected content 75% of the time and advertisements 25% of the time. The displayed personal message may thus cycle through these categories as well as multiple pieces of content within each category. In addition, some personal messages may include a combination of user-selected content and an advertisement.

Selecting the Piece of Content Responsive to the Sharing

Figure 5:
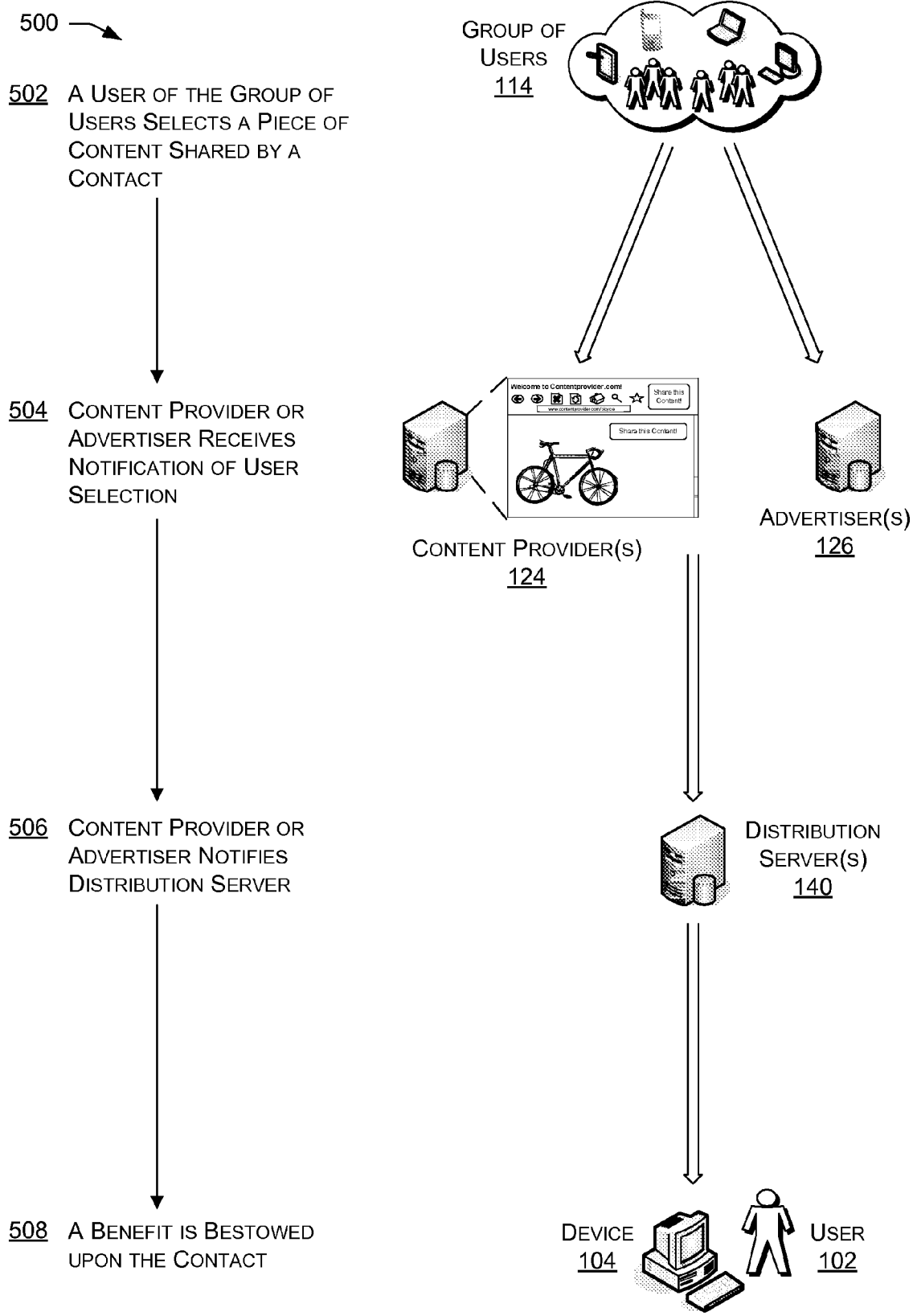
FIG. 5 illustrates a process for selecting a piece of content in response to the sharing by the particular user or the third party. In some instances, the particular user receives a benefit in response to a user selecting the piece of content.

FIG. 5 depicts an illustrative process 500 in which one of the users with whom a piece of content is shared, in turns selects the piece of content in response to the sharing by user 102 or a third party such as advertiser 126. That is, FIG. 5 illustrates operations that may occur after the piece of content has been shared in the manners discussed above and after a user of group of users 114 selects the piece of content in response to the sharing. In some instances, user 102 receives a benefit in response to a user selecting the piece of content. In other instances, user 102 receives a benefit in response to a user selecting the piece of content and purchasing a related item.

FIG. 5 includes operation 502, which represents that a user of group of users 114 selects a piece of content shared by a contact such as user 102. For instance, imagine that the user of group of users 114 employs instant messaging client 118 of FIG. 1. This user selects personal message 110 associated with user 102. As such, this user of group of users 114 navigates to the following URL: "www.contentprovider.com/bicycle". Selection of this piece of content could also occur within a Webpage of a social networking Website in some implementations.

At operation 504, content provider 124 and/or advertiser 126 receives a notification of the user selection. At operation 506, the content provider and/or the advertiser notify distribution server 140. At operation 508, a benefit is bestowed upon user 102 in response to the selecting. Advertiser 126, content provider 124, and/or distribution server 140 may bestow this benefit upon user 102. In addition, advertiser 126 and/or content provider 124 may bestow a benefit (e.g., money) upon an entity that controls the instant messaging or social networking community.

Additionally, note that user 102 may receive a benefit in response to a user of group of users 114 selecting the piece of content and/or in response to a user of group of users 114 purchasing something after this selection. User 102 may be compensated in multiple ways, including via a pay-per-click method or by receiving a share of the revenue directly related to the user's sharing of the content. In the current example for instance, imagine that a user of group of users 114 not only selects personal message 110 to navigate to Web address 134, but also purchases the associated bicycle. In response to this purchase, user 102 may receive a portion of the purchase price.

Illustrative Processes

Figure 6:
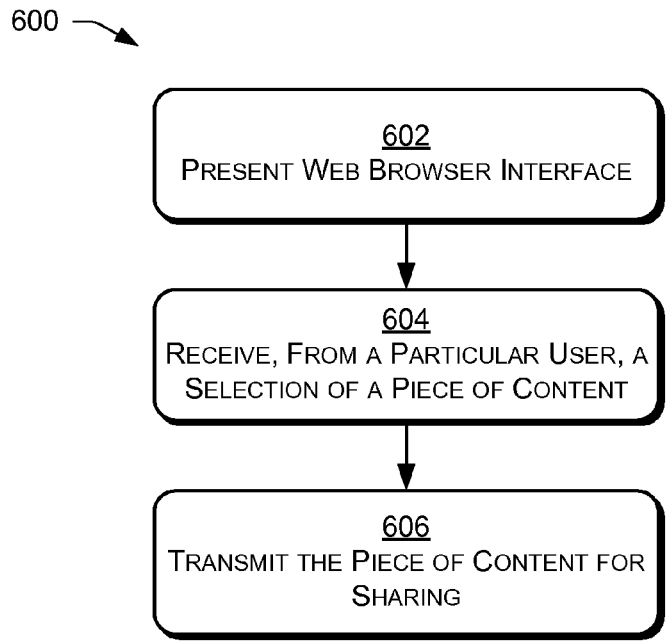
FIGS. 6-8 illustrate processes for implementing the selecting and sharing of content illustrated by FIGS. 1-5.

FIG. 6 illustrates an illustrative process 600 for implementing the selecting and sharing of a piece of content illustrated by FIGS. 1-5. Process 600, as well as other described processes, is illustrated as collections of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 600 includes operation 602, which represents presenting a Web browser interface. This interface includes a piece of content and may include an icon that, upon actuation, allows a particular user to share the piece of content. At operation 604, a selection of the piece of content is received from the particular user. Again, the particular user actuates the icon to select the content. Finally, operation 606 represents transmitting the piece of content for sharing the piece of content with a group of users, each of which specify the particular user as a contact. This group of users may also include contacts of the particular user.

Figure 7:
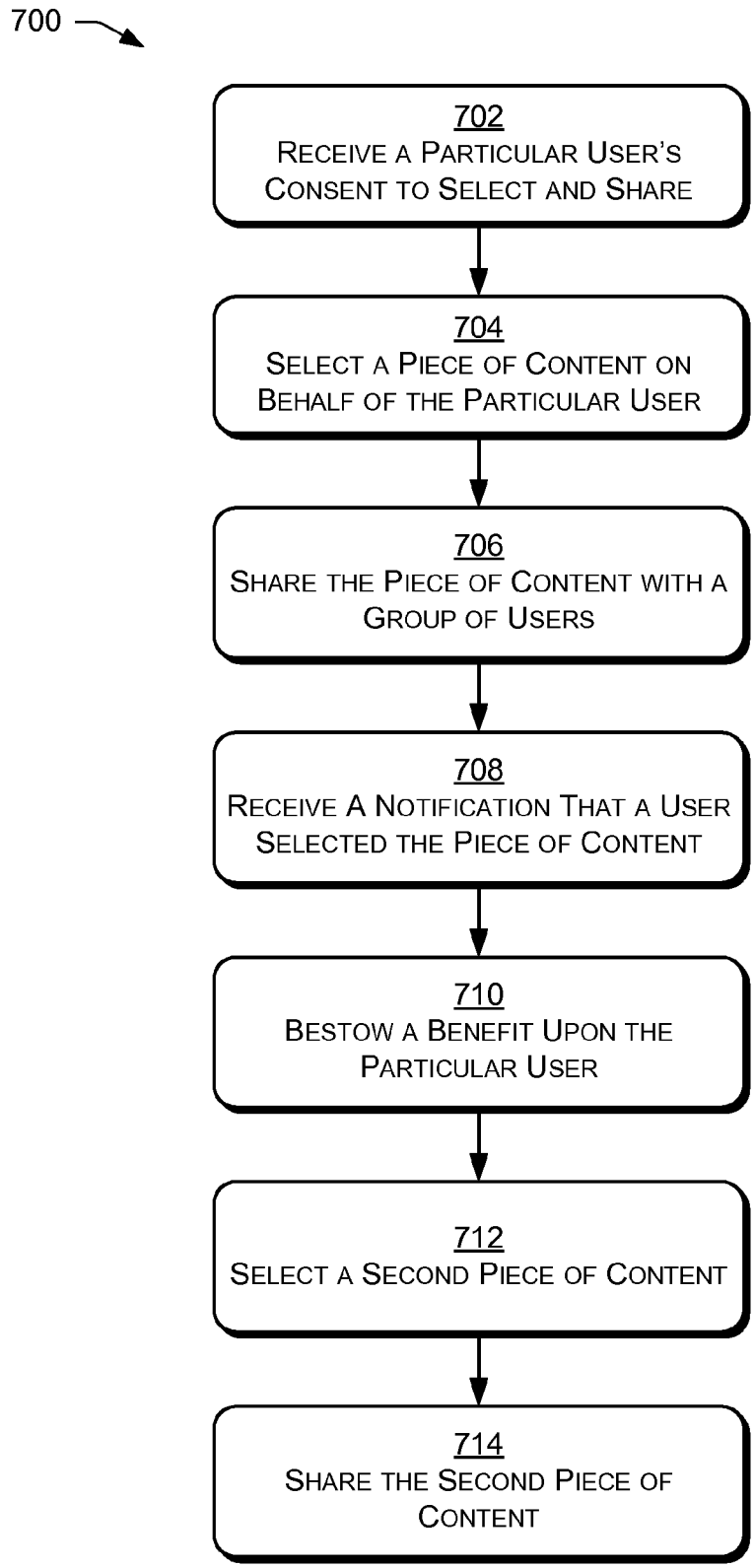

FIG. 7 illustrates another illustrative process 700 for implementing the selection and sharing of content. This process includes operation 702, which represents receiving a particular user's consent to select and share one or more pieces of content. Operation 704 then represents selecting a piece of content on behalf of the particular user. A third party such as an advertiser makes this selection. At operation 706 the piece of content is shared with a group of users, each of which includes the particular user as a contact. This group may also include contacts of the particular user. Operation 708 then represents receiving a notification that a user of the group of users selected the piece of content in response to the sharing.

Operation 710, meanwhile, bestows a benefit upon the particular user. This benefit may be received in response to the selection of operation 708 or in response to a user of the group of users purchasing an item associated with the shared content. Operation 712 represents selecting a second piece of content. Again, a third party such as the advertiser makes this selection. Finally, operation 714 represents that the second piece of content is shared amongst the group of users discussed above.

Figure 8:
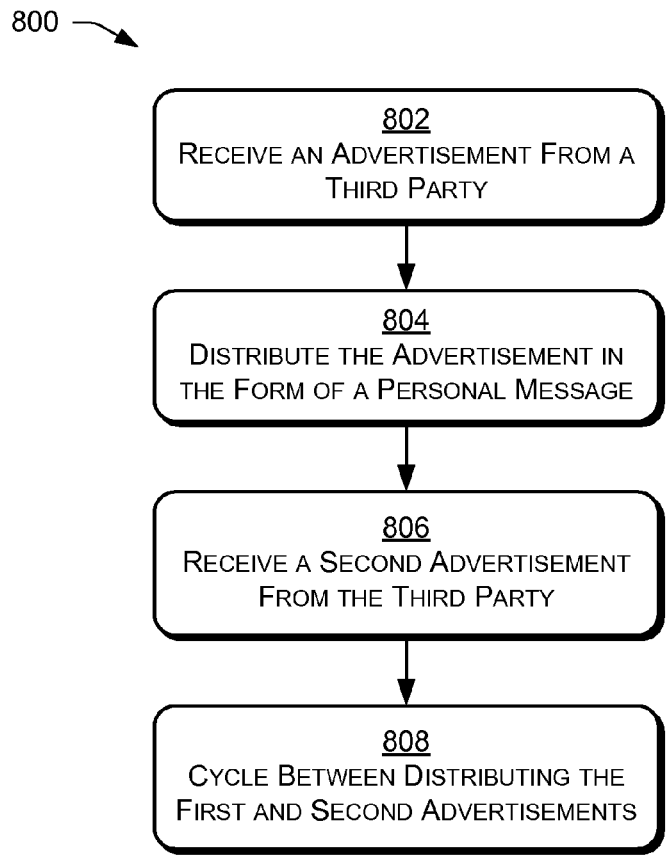

FIG. 8 depicts another illustrative process 800, which include operations 802-808. At operation 802, an advertisement is received from a third party responsive to a user granting the third party authority to determine a personal message of the user. An instant messaging client such as client 106 or a distribution server such as server 140 receives this advertisement in some instances. Operation 804 then represents distributing the advertisement in the form of the personal message, such as personal message 110. This personal message may be distributed to group of users 114 or the like.

Operation 806 then represents receiving a second advertisement from the third party. Finally, operation 808 cycles between distributing the first and second advertisements to the group of users.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   selecting, by an advertiser, an advertisement associated with an item for sale on behalf of a particular user;
   receiving the particular user's consent to allow the advertiser to select the advertisement and share the advertisement with a group of users;
   sharing, by the advertiser, the advertisement as a personal message from the particular user with a respective instant messaging client associated with each user of a group of users, each of which includes the particular user as a contact, on the respective instant messaging client and each of the instant messaging clients displaying the personal message from the particular user that includes the advertisement, the sharing comprising transmitting the advertisement to the group of users to enable association between the advertisement and the particular user on a contacts list of each user of the group of users;
   selecting, by the advertiser, additional differing advertisements to be shared, the sharing comprising transmitting the additional differing advertisements selected by the advertiser based upon an agreed-upon schedule between the particular user and the advertiser such that the personal message of the particular user displays one of the additional differing advertisements a user specified percentage of time on each of the instant messaging clients as the transmission cycles through the additional differing advertisements;
   receiving an indication that a user of the group of users has purchased the item for sale in response to the sharing of the advertisement as the personal message from the particular user; and
   bestowing a monetary benefit upon the particular user in response to the receiving of the indication that the user of the group of users has purchased the item for sale associated with the advertisement wherein the selecting an advertisement, the receiving the particular user's consent, the sharing, the selecting additional differing advertisements, the receiving the indication, and the bestowing are performed on one or more computers.

2. A method as recited in claim 1, further comprising receiving a notification that a user of the group of users selected the advertisement in response to the sharing.

3. A method as recited in claim 1, further comprising bestowing a benefit upon the particular user in response to a user of the group of users selecting the advertisement in response to the sharing.

4. A method as recited in claim 1, the advertisement is a first advertisement, and further comprising:
   selecting, by the advertiser, a second advertisement on behalf of the particular user; and
   sharing the second advertisement with the group of users.

5. One or more computer storage structures comprising computer-executable instructions that, when executed, cause one or more processors to perform a method comprising:
   receiving, by the one or more processors, a particular user's consent to allow an advertiser to select and share multiple different advertisements each associated with an item for sale as a personal message of the particular user;
   selecting, by the advertiser, a first advertisement on behalf of the particular user;
   sharing, by the advertiser, the first advertisement with a respective instant messaging client associated with each user of a group of users, each of which includes the particular user as a contact on the respective instant messaging client and each of the instant messaging clients displaying the personal message from the particular user that includes the first advertisement, the sharing comprising transmitting the first advertisement to the group of users to enable association between the first advertisement and the particular user on a contacts list of each user of the group of users;
   selecting, by the advertiser, a second advertisement on behalf of the particular user;
   sharing, by the one or more processors, the second advertisement as the personal message of the particular user with each instant messaging client of the group of users;
   sharing, by the one or more processors, additional advertisements based upon an agreed-upon schedule between the particular user and the advertiser such that the personal message of the particular user displays one of the additional advertisements a user specified percentage of time on each of the instant messaging clients as the transmission cycles through the additional advertisements;
   receiving, by the one or more processors, an indication that a user of the group of users has purchased an item for sale associated with the second advertisement in response to the sharing of the second advertisement as the personal message from the particular user; and
   bestowing a monetary benefit upon the particular user in response to the receiving of the indication that the user of the group of users has purchased the item associated with the second advertisement.

6. A system comprising:
   one or more processors;
   one or more computer storage structures storing computer-executable instructions that, when executed, cause the one or more processors to perform a method comprising:
      receiving, by the one or more processors, a particular user's consent to allow an advertiser to select and share multiple different advertisements each associated with an item for sale as a personal message of the particular user;
      selecting, by the advertiser, a first advertisement on behalf of the particular user;
      sharing, by the one or more processors, the first advertisement with a respective instant messaging client associated with each user of a group of users, each of which includes the particular user as a contact on the respective instant messaging client and each of the instant messaging clients displaying the personal message from the particular user that includes the first advertisement and metadata corresponding to the first advertisement, the metadata comprising a link, an image, a video, an animation, audio and/or an executable program;
      selecting, by the third party, a second advertisement on behalf of the particular user;

sharing, by the one or more processors, the second advertisement as the personal message of the particular user with each instant messaging client of the group of users;

sharing, by the one or more processors, additional advertisements based upon an agreed-upon schedule between the particular user and the advertiser such that the personal message of the particular user displays one of the additional advertisements a user specified percentage of time on each of the instant messaging clients as the transmission cycles through the additional advertisements;

receiving, by the one or more processors, an indication that a user of the group of users has purchased an item for sale associated with the second advertisement in response to the sharing of the second advertisement as the personal message from the particular user; and bestowing a monetary benefit upon the particular user in response to the receiving of the indication that the user of the group of users has purchased the item associated with the second advertisement.

* * * * *